July 10, 1945.　　　J. H. ROETHEL　　　2,379,925
WINDOW GUIDE
Filed April 4, 1941　　　2 Sheets-Sheet 1
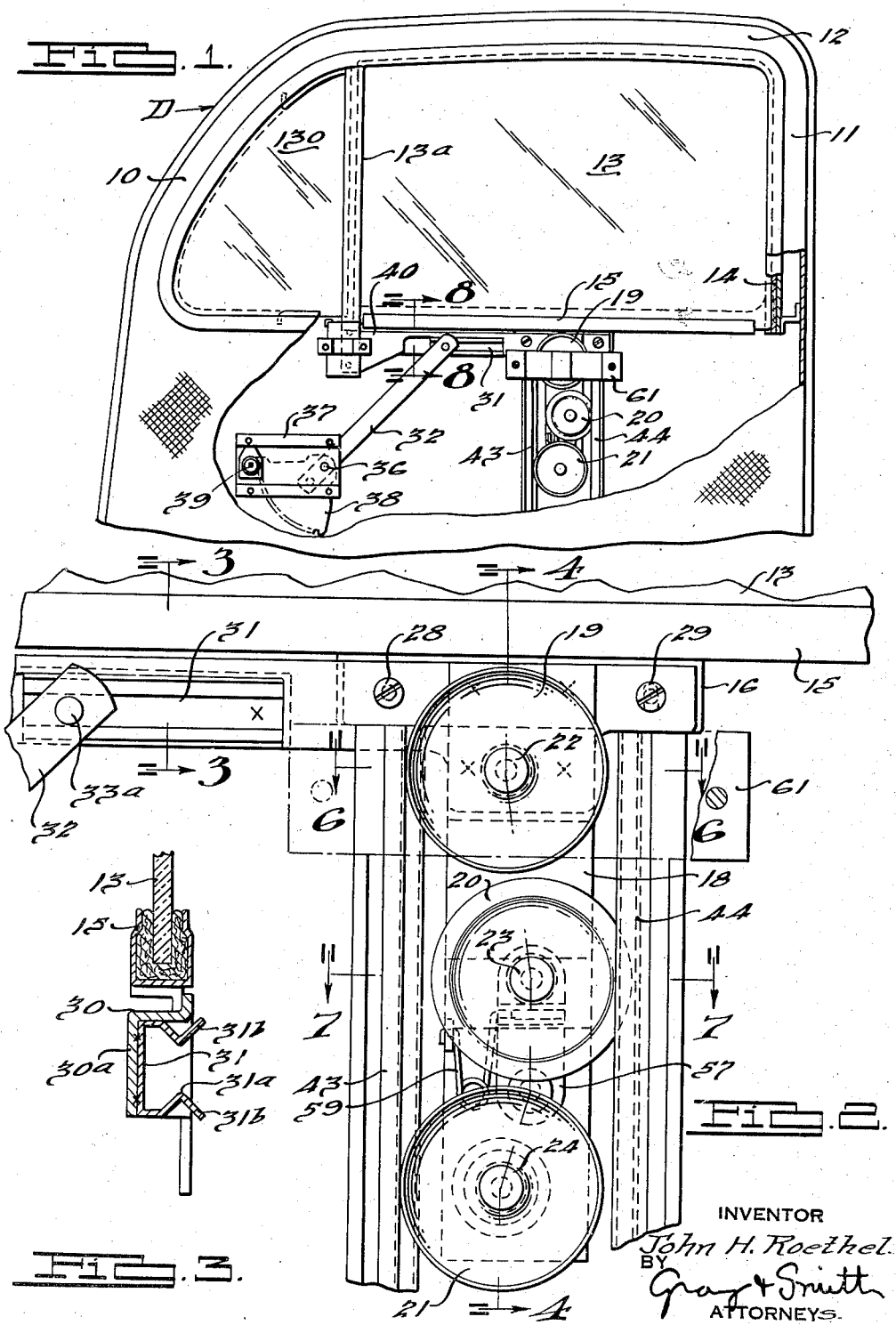
INVENTOR
John H. Roethel.
BY
Gray & Smith
ATTORNEYS.

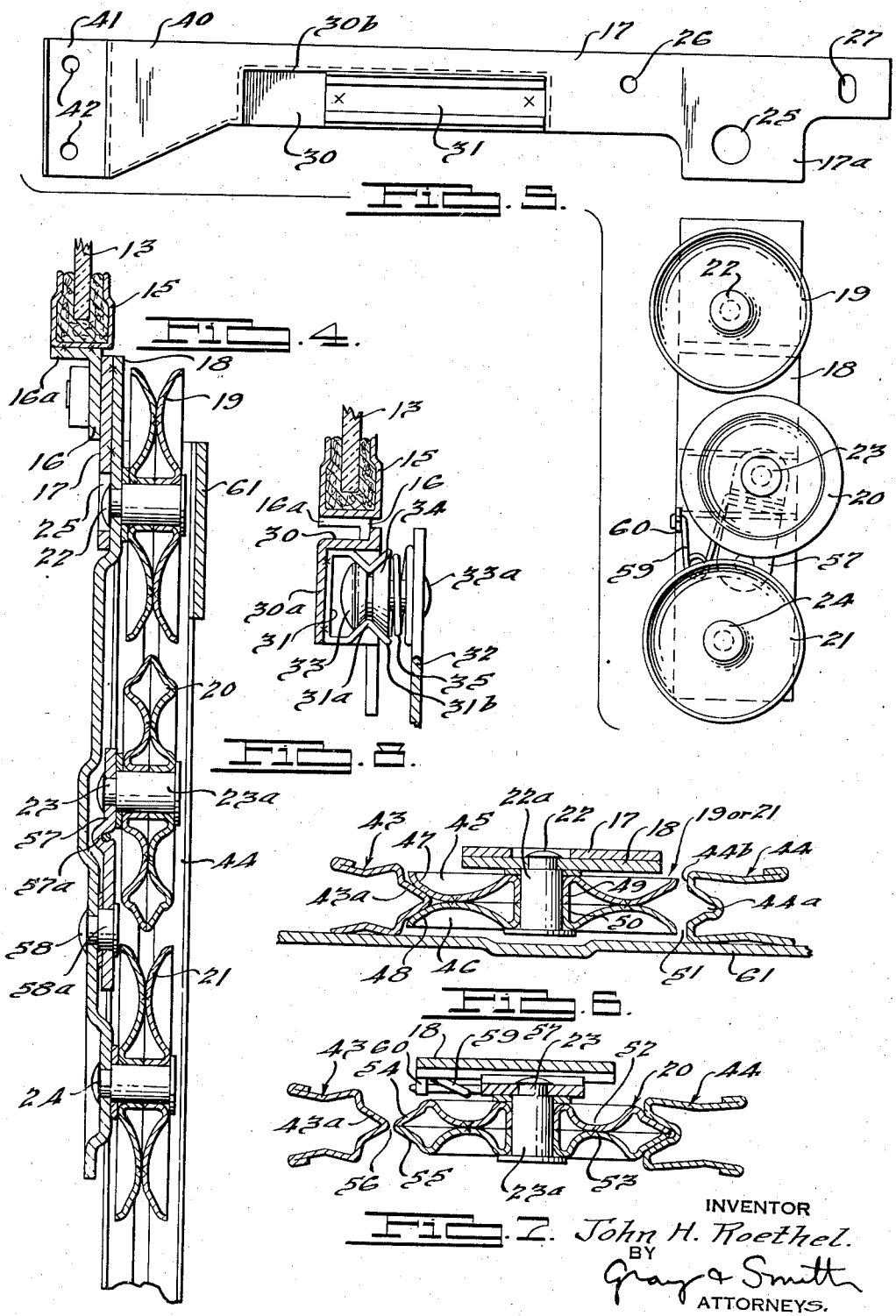

Patented July 10, 1945

2,379,925

UNITED STATES PATENT OFFICE 2,379,925

WINDOW GUIDE

John H. Roethel, Detroit, Mich., assignor to Marvel Equipment Corporation, Detroit, Mich., a corporation of Michigan Application April 4, 1941, Serial No. 386,782

6 Claims. (Cl. 296—44.5)

This invention relates to window control mechanism, particularly although not exclusively adapted for use in connection with vehicles and especially automobiles. In general the invention contemplates the provision of improved means for guiding the window panel in the desired path, usually in a vertical direction in connection with the principal windows of present day automobiles.

Another object of the invention is to provide guiding means for guiding the window panel, such guiding means including improved guide devices or roller guide devices cooperable with fixed guides within the window well and effective not only to hold the window panel against any appreciable tilting in its plane but also to reduce to a minimum frictional resistance to the travel of the panel, thus minimizing the power required to operate the window panel.

A further object of the invention is to provide improved guiding means for the window glass or panel which may be arranged below and near the center of the panel, the improved construction of the guiding means being such as to hold the window panel for travel in a straight line path against any material tendency to tilt or cock or shift transverse to its plane.

It is also an object of the invention to provide improved roller guide mechanism for a sliding window panel which is compact, relatively simple in construction, easy to install, relatively inexpensive to manufacture, efficient and more nearly frictionless in operation than heretofore.

A further object of the invention is to provide an improved center or intermediate guide structure for a window panel particularly useful in connection with automotive vehicles, in which a pair of vertically spaced guide devices on the lower edge of the panel, particularly rollers or wheels, cooperate with a fixed guide in the window well and are normally held in one guiding position through resilient means, such as an intermediate roller guide device adapted to travel on a second fixed guide in the window well, the construction being such as to provide a guiding means adapted to positively control the window panel and at the same time substantially free from objectionable noises or chattering effects which might result from vibrations of the car or slamming of the door of the car.

A further object of the invention is to provide a center or intermediate guide structure for a window panel in which guide devices on the panel cooperate selectively with fixed guides in the window well and are normally held through resilient means in one guiding position although capable of shifting to another guiding position with respect to the fixed guides, the construction and arrangement being such as to provide a simple, compact and more nearly frictionless guiding means for the window panel.

Other objects of this invention will appear in the following description and appended claims, reference being had to the accompanying drawings forming a part of this specification wherein like reference characters designate corresponding parts in the several views.

Fig. 1 is an inner fragmentary side elevation, partly broken away and partly in section, of an automobile door embodying the invention.

Fig. 2 is an enlarged fragmentary side elevation of a portion of the guide structure including the fixed guides within the window well and the guiding means depending from the lower edge of the window panel.

Fig. 3 is a section taken substantially through lines 3—3 of Fig. 2 looking in the direction of the arrows.

Fig. 4 is an enlarged vertical section taken substantially through lines 4—4 of Fig. 2 looking in the direction of the arrows.

Fig. 5 is an exploded view of the guide structure adapted to be secured to the lower edge of the window panel.

Fig. 6 is an enlarged section taken substantially through lines 6—6 of Fig. 2 looking in the direction of the arrows.

Fig. 7 is an enlarged section taken substantially through lines 7—7 of Fig. 2 looking in the direction of the arrows.

Fig. 8 is an enlarged section taken substantially through lines 8—8 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated a certain embodiment of the invention applied, by way of example, to an automobile door, such as a front door of an automobile. It will be understood, however, that the embodiment herein exemplified in part or in whole may be used in other relations and in other window structures. In particular it will be understood that the guiding means and the window glass operating mechanism may be utilized not only conjointly as herein shown but also separately, and these may be used generally in vehicle bodies or the like not only in connection with window panels which are adapted to be raised and lowered but also window panels, such as the rear quarter windows of automobiles of the closed or convertible types, which are adapted to be shifted horizontally or swung in a generally vertical direction into open and closed positions. Where the invention is used in connection with window panels movable otherwise than in a straight line vertical path, it will be understood that the parts in general will be re-arranged to accommodate the particular selected path of movement of the panel.

In Fig. 1 there is illustrated a front door D of an automobile including upright side pillars 10 and 11 joined by a header 12, thus providing a window frame in the form of a closed figure defining a main window opening adapted to be closed in part by means of a vertically slidable glass or other transparent panel 13. In the present instance the remaining portion of the window opening is closed by means of a wing type panel 130 of conventional type, the panels 13 and 130 being separated by a vertical guide bar 13a which may either be attached to the forward edge of the panel 13 or fixed within the window opening to provide a guide for the corresponding edge of the panel 13 when raised and lowered. The window frame pillar 11 may be provided with a groove or glass run-way channel 14, terminating at the bottom of the window opening and designed to receive the corresponding edge of the panel 13.

Secured to the lower edge of the glass panel 13 is a channel bar or glass retainer member 15 to which the window regulator and the movable guide means are adapted to be connected. A depending angle member 16 having a top horizontal flange 16a is spot welded to the bottom of the retainer channel 15. Detachably connected to the vertical flange of the angle bar 16 is a carrier which, as shown particularly in Fig. 5, comprises a pair of supporting members or plates 17 and 18. The plate or bar 17 extends horizontally and engages the inner face of the angle bar 16, being provided with a short depending extension 17a. The plate or bar 18 extends vertically and overlaps the face of the member 17 at the locality of the extension 17a and is secured thereto, as by spot welding, as shown in Fig. 4. Thus, the carrier members 17 and 18 are permanently secured together and are in the form of a T-structure. The depending extension 18 of the carrier rotatably supports a series of guide devices which in the present instance are in the form of rollers or wheels 19, 20 and 21. The rollers 19 and 21 are in vertical alinement and are mounted to revolve or turn on fixed studs or pivots 22 and 24, respectively, carried by the member 18. The intermediate roller or wheel 20 is yieldingly mounted and is supported to rotate upon a stud or pivot 23. The construction of the several rollers or wheels will be more fully described hereinafter.

The carrier bar 17 has a hole or aperture 25 in line with the end of the stud or rivet 22 to permit access thereto when installing the upper roller 19. The bar 17 also has a hole 26 and a vertical adjusting slot 27 adapted to receive screws 28 and 29, respectively, by means of which the carrier unit 17, 18 may be detachably connected to the vertical flange of the angle bar 16. The screw 29 is adjustable within the slot 27 to permit the angularity of the carrier to be varied slightly in order to line up the window panel 13 with the rear upright edge of the wing panel 130.

The carrier member 17 is constructed to permit connection thereto of the swinging arm 32 of a window regulator and to facilitate easy assembly thereof with the guide structure. In the present instance the bar 17 has a relatively long laterally extending arm pressed to provide a horizontally extending offset portion 30. This offset portion houses a channel member 31 whose vertical web may be spot welded to the back wall 30a of the offset 30. The inwardly extending flanges of the channel 31 have V-shaped portions 31a providing diverging terminal flanges 31b. The swinging arm 32 of the regulator is provided with a headed stud 33 adapted, as shown in Fig. 8, to be interlocked with the constricted portions 31a within the guideway of the channel 31. The stud 33 is riveted to the regulator arm at 33a and is yieldingly held in position by means of a conical washer 34 influenced by a compression spring 35 and engaging the tapered faces 31b. The connecting channel 31 for the regulator, as shown in Fig. 5, terminates short of the end of the offset 30 so as to provide an open space 30b into which the headed stud 33 may enter in order to shift the stud through the end of the guideway formed by the channel 31, thereby assembling the regulator arm with the carrier bar 17. The window regulator may be of any suitable type and in the present instance comprises a single arm regulator in which the arm 32 is pivoted at 36 to a mounting plate 37 secured by screws to the inner door or body panel. The arm 32 is attached to a gear 38 driven in the usual manner by a pinion controlled from a handle shaft at the locality 39.

Where, as in the present illustrated example, the invention is utilized in an automobile front door having a split window and having the bar 13a movable downwardly into the window well with the sliding window panel 13, the carrier bar 17 may be extended laterally so that the lower end of the guide bar 13a may be attached to the end of the carrier bar 17. To accommodate this purpose the bar 17 in the present instance has an extension 40 terminating in a flange portion 41 into which the lower end of the guide bar 13a may be fitted, holes 42 being provided for the purpose of receiving screws in order to attach the parts together.

The window panel 13 is guided in a generally vertical direction through the medium of the roller guide devices 19, 20 and 21 which cooperate with a pair of fixed upright channel guides mounted entirely within the window well below the lower edge of the window opening and preferably at a point substantially centrally located between opposite ends of the window panel. The fixed rollers or wheels 19 and 21 together cooperate normally with a channel guide 43 and the intermediate spring pressed roller 20 normally cooperates with a channel guide 44. The upper ends of these guides are supported in fixed longitudinally spaced relation within the well through the medium of a suitable bracket 61 flanged for attachment to the inner door or body panel 62 of the vehicle. As shown in Figs. 6 and 7, the guide 43 has spaced side flanges terminating in a connecting web rolled or formed to provide a projecting generally V-shaped rib 43a forming a track along the length of the channel guide. The opposite channel guide 44 also has spaced side flanges terminating in a connecting web rolled or otherwise formed with a V-shaped channel or groove 44a. The diverging sides of this groove or channel terminate preferably in flat faces 44b.

The guide rollers 19 and 21 are preferably identical in construction and each in the present instance is formed from two metal blanks of complementary construction. As illustrated in Fig. 6, each roller or wheel 19 and 21 is formed with two annular concave or dished portions 45 and 46 arranged face to face and spot welded together. These portions flare outwardly to provide diverging tracking portions 47 and 48 forming an annular groove around the periphery of the wheel adapted to embrace the V-shaped track or rib 43a of the channel guide 43. The mating sections of the wheel are also formed with inturned alined flanges 49 and 50 forming a cylindrical portion fitting over the bearing portion 22a of the stud 22 or the corresponding bearing of the stud 24, as the case may be. The intermediate roller or wheel 20 is also formed from two metal blanks similarly constructed to provide annular concave or dished portions 52 and 53 arranged in abutting relation and spot welded together. In this instance the periphery of the wheel or roller is formed with converging tapered portions 54 and 55 adapted to fit into the V-shaped groove or channel 44a of the guide 44. The wheel 20 is flanged centrally thereof, similarly to the rollers 19 and 21, to fit upon the bearing portion 23a of the stud 23. The stud 23 is riveted to the outer end of a swinging link 57, the opposite end of the link being pivoted upon the bearing portion 58a of a shoulder rivet 58 secured to the carrier member 18. The roller 20 is urged toward the channel guide 44 by means of a spring 59 having intermediate coils, one end of the spring being anchored in a groove in an embossment 57a of the arm 57 and the opposite end of the spring being anchored to a lug 60 struck out from the metal of the plate 18.

The spring pressed roller 20 at all times travels along the track 44a of the channel guide 44, in the manner shown in Fig. 7, and by reason of the selected diameter of this roller the extreme edge of the roller will be slightly spaced at 56 from the apex of the V-shaped track 43a, thus permitting the roller 20 to rotate freely on the stud 23a as it travels along the guide 44. The rollers or wheels 19 and 21 normally travel along the channel guide 43 and by reason of the pressure exerted by the spring pressed roller 20, the rollers 19 and 21 will normally occupy the position shown in Fig. 6 with their peripheral grooves embracing the rib or track 43a and tracking therealong. By reason of the selected diameter of the rollers 19 and 21 they will, as shown in Fig. 6, be normally spaced a slight amount at 51 from the opposed faces 44b of the channel guide 44. Thus, the rollers 19 and 21 will at all times be freely rotatable upon their pivot studs 22 and 24.

From the foregoing it will be seen that the window panel 13 is guided for up and down movement against any material tilting or cocking movement in the plane of the glass. The rollers 19 and 21 have effective engagement normally only with the track 43a of the guide 43. The pressure of the roller 20 against the guide 44 will normally hold the upper and lower rollers against the guide 43, the clearances spaces 51 preventing under such circumstances the upper and lower rollers from being cramped by the channel guides in such manner as to prevent them from rotating when the window panel is raised and lowered. At the same time the clearance space 56 prevents the roller 20 from being cramped between the channel guides. If during operation of the window regulator a force is exerted thereon tending to shift the window panel longitudinally toward the right in Fig. 1, this action will be resisted by the spring pressed roller 20. However, the panel can shift in its plane longitudinally only to the extent of the clearances 51, at which time the rollers 19 and 21 will track along the edges 44b of the guide 44. At no time will the upper and lower rollers 19 and 21 track effectively with any portions of both channel guides so as to prevent free rotation of the rollers.

It will be seen that the vertically spaced arrangement of the roller guide devices along the channel guide will hold the window glass against any material tilting or cocking in its plane, the clearances 51 being insufficient to permit any material or noticeable tilting movement. In the event of any such slight tilting movement one of the rollers 19 or 21 will track along one channel guide and the other roller 19 or 21 will track along the opposite channel guide. It will be further seen that the interfitting relation between the rollers 19 and 21 and the track portion 43a of the channel guide 43, also the interfitting relation between the tapered periphery 54, 55 of the roller 20 with the grooved track 44a of the channel guide 44 will result in holding the window panel against movement in a direction transverse to the plane of the panel. Furthermore, the relation of these parts is such that at no time, even under extreme conditions, can the rollers jump out of tracking relation with their guides, such as when the door is slammed.

It will be noted that the track portion 43a of the guide 43 is reverse to the track portion 44a of the guide 44, the one being in the form of a V-shaped rib and the other being in the form of a V-shaped groove. By forming the guide 44 with the groove 44a instead of the tracking rib as at 43a, it is possible to normally space all portions of the guide 44 away from the rollers 19 and 21 so that any slight transverse movements of the rollers due to vibrations or closing of the door will not result in either of the rollers 19 and 21 contacting the guide 44 and causing an objectionable noise.

I claim:

1. A vehicle body window structure having a window panel mounted for up and down movement in a window frame having a well, comprising a pair of fixed upright guides comprising channels, one with a rib track and the other with a grooved track, vertically spaced guide rollers including a longitudinally yieldable roller mounted on the lower edge of the panel to extend therebelow, one roller having a peripheral groove cooperable with said rib track and the other roller having a peripheral rib cooperable with the grooved track, the sides of said grooved track being normally slightly spaced from the rims of the grooved roller but engageable therewith when the yieldable roller yields sufficiently in a longitudinal direction to permit such engagement.

2. A vehicle body window structure having a window panel mounted for up and down movement in a window frame having a well, comprising a pair of fixed upright guides comprising channels, one with a rib track and the others with a grooved track, vertically spaced guide rollers including a longitudinally yieldable roller mounted on the lower edge of the panel to extend therebelow, one roller having a peripheral groove cooperable with said rib track and the other roller having a peripheral rib cooperable with the grooved track, each roller when in engagement with one track being slightly spaced from and out of engagement with the opposite track, the rims of the grooved roller engaging opposite sides of the groove in the grooved track to positively guide the window panel when the yieldable roller yields sufficiently in a longitudinal direction to permit such engagement.

3. A guide structure for a vehicle window panel mounted for up and down movement, comprising a pair of vertically spaced guide rollers mounted on the lower edge of the panel, a pair of upright guides, one guide having a projecting portion fitting into a peripheral groove in one roller and the other roller having a portion fitting into a groove in the other guide, and means for yieldingly supporting one roller to permit longitudinal displacement of the other roller for travel along either guide.

4. A guide structure for a vehicle window panel mounted for up and down movement, comprising a pair of guide rollers mounted on the lower edge of the panel, a pair of upright guides, one guide having a projecting portion fitting into a peripheral groove in one roller and the other roller having a portion fitting into a groove in the other guide, and yielding means permitting one roller to shift longitudinally in the direction of the plane of the panel to travel selectively along either guide.

5. A guide structure for a vehicle window panel mounted for up and down movement, comprising a pair of vertically spaced guide rollers mounted on the lower edge of the panel, a pair of upright guides, one guide having a projecting portion fitting into a peripheral groove in one roller and the other roller having a portion fitting into a groove in the other guide, and yieldable means for holding one of said rollers in position to travel on one guide but yieldable in the longitudinal direction of the plane of the window panel to permit such roller to shift slightly in a longitudinal direction to travel on the other guide.

6. A guide structure for a vehicle window panel mounted for up and down movement, comprising a pair of vertically spaced guide rollers mounted on the lower edge of the panel, one roller being fixed with relation to the panel and the other roller being yieldable longitudinally with respect to said panel, a pair of upright guides, one guide having a projecting portion fitting into a peripheral groove in one roller and the other roller having a portion fitting into a groove in the other guide and yieldable means for holding one of said rollers in position to travel on one guide but yieldable in the longitudinal direction of the plane of the window panel to permit such roller to shift slightly in a longitudinal direction to travel on the other guide.

JOHN H. ROETHEL.